US006588382B2

(12) United States Patent
Uneta

(10) Patent No.: US 6,588,382 B2
(45) Date of Patent: Jul. 8, 2003

(54) TWO-CYCLE INTERNAL COMBUSTION ENGINE

(75) Inventor: Hisashi Uneta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/903,714

(22) Filed: Jul. 13, 2001

(65) Prior Publication Data
US 2002/0020369 A1 Feb. 21, 2002

(30) Foreign Application Priority Data
Jul. 14, 2000 (JP) ...................................... 2000-213620
Jan. 26, 2001 (JP) ...................................... 2001-018021

(51) Int. Cl.⁷ ............................................... F02B 33/04
(52) U.S. Cl. .................. 123/73 C; 123/445; 123/65 PE
(58) Field of Search ............................ 123/73 C, 65 R, 123/65 PE, 73 PP, 445, 450

(56) References Cited
FOREIGN PATENT DOCUMENTS
JP          10-325323          12/1998

Primary Examiner—Tony M. Argenbright
Assistant Examiner—Katrina B. Harris
(74) Attorney, Agent, or Firm—Birch, Stewart, Kolasch & Birch, LLP

(57) ABSTRACT

A two-cycle internal combustion engine including: a cylinder; an exhaust opening provided in a portion, on one side in the peripheral direction, of the cylinder; a plurality of scavenging openings for performing schnurle scavenging, the scavenging openings being located at positions which are laterally symmetric with respect to a cylinder symmetric plane containing the exhaust opening and the center line of the cylinder; a chamber portion adjacent to the cylinder; a communication passage for communicating the cylinder to the chamber portion, the communication passage having a cylinder side opening located opposite to the exhaust opening with respect to the center line of the cylinder; and a control valve for openably/closably controlling the communication passage so as to blow a rich air-fuel mixture into the combustion chamber from the cylinder side opening of the communication passage by a high compression gas stored in the chamber portion.

22 Claims, 15 Drawing Sheets

TWO-CYCLE INTERNAL COMBUSTION ENGINE

BACKGROUND OF THE INVENTION

1. Field of the Invention

The present invention relates to an improvement in the injection direction of an air-fuel mixture into a cylinder of a two-cycle internal combustion engine, the internal combustion engine being configured to prevent blow-by of the air-fuel mixture. With this construction, fuel consumption of the internal combustion engine is decreased and exhaust gas purifying performance is enhanced.

2. Description of Background Art

In conventional two-cycle internal combustion engines, the supply of an air-fuel mixture has been performed by mixing fuel supplied from a carburetor or the like with intake air. The air-fuel mixture is then sucked into the crank chamber and supplied to the combustion chamber via scavenging openings. The supply of the air-fuel mixture in the conventional engine; however, has a problem since the opening timing of an exhaust opening is set to be earlier than the opening timing of the scavenging openings. Accordingly, a so-called blow-by phenomenon may often occur, wherein the air-fuel mixture supplied to the combustion chamber is discharged to the exhaust passage.

To solve the above problem, the present applicant has disclosed a two-cycle internal combustion engine in Japanese Patent Laid-open No. Hei 10-325323. FIG. 14 of the present invention is a longitudinal sectional view of the internal combustion engine disclosed in the above document, and FIG. 15 is a horizontal sectional view taken on a plane passing through a rotary valve shown in FIG. 14. In these figures, an exhaust passage 017, which has an exhaust opening 018 formed on one side in the peripheral direction of a cylinder 005, is provided in a cylinder block 003. A chamber portion 021 is provided in the cylinder block 003 in such a manner as to be located on the side remote from the exhaust passage 017. Two kinds of communication passages for communicating an upper portion of the cylinder 005 to the chamber portion 021 are provided in the cylinder block 003. The two kinds of communication passages are two first communication passages 030 for allowing a high compression gas to flow from a combustion chamber 019 to the chamber portion 021, and one second communication passage 031 for allowing the air-fuel mixture to flow from the chamber portion 021 to the combustion chamber 019. A cylinder side opening 034 of the second communication passage 031 is located at a position opposite to that of the exhaust opening 018 with respect to the center line of the cylinder 005.

Two pairs of right and left scavenging passages 013 for supplying air are provided. Each pair of the scavenging passages 013 have openings at positions being laterally symmetric with respect to the plane containing the exhaust opening 018 and the center line of the cylinder 005. A scavenging passage 015 for supplying air is also provided. The scavenging passage 015 has an opening 016 at a position opposite to that of the exhaust opening 018 formed in the cylinder 005. Schnurle scavenging (reverse scavenging) is performed by air blown from these scavenging openings.

A rotary valve 042 is provided in such a manner as to cross mid portions of the communication passages 030 and 031. A control valve is provided around the rotary valve 042. The control valve is composed of two first control valves 056 provided in the first communication passages 030 and one second control valve 057 provided in the second communication passage 031. The first control valves 056 are operative for opening the first communication passages 030 nearly at a point of time when the exhaust opening is closed, and closing the first communication passages 030 at a mid point in the compression stroke. The second control valve 057 is operative for opening the second control valve 031 nearly at a point of time when the scavenging openings are closed, and closing the second communication passage 031 at a mid point before the first communication passages 030 are closed in the compression stroke.

Right and left fuel injectors 048 are laterally symmetrically mounted on both sides of the cylinder block 003. Immediately before the second control valve 057 opens the second communication passage 031, fuel injected from the fuel injectors 048 is blown obliquely from below in an air-fuel mixture forming space facing toward the cutout functioning as the second control valve 057. To be more specific, fuel injected from the right fuel injector 048 is blown obliquely leftwardly toward an approximately central portion of the second communication passage 031, and similarly, the fuel injected from the left fuel injector 048 is blown obliquely rightwardly toward the approximately central portion of the second communication passage 031 (see FIG. 15).

When the second control valve 057 opens the second communication passage 031 along with the rotation of the rotary valve 042, a high compression gas charged in the chamber portion 021 flows in the second communication passage 031 from the chamber portion side opening of the second communication passage 031, to be mixed with standby fuel. The air-fuel mixture thus formed is press-fed by high pressure in the chamber portion 021, to be injected into the combustion chamber 019 from the cylinder side opening 034 of the second communication passage 031.

In the internal combustion engine of this type, as shown by arrows in FIGS. 14 and 15, a rich air-fuel mixture 060 is injected toward an ignition plug 020 mounted to an upper portion of the combustion chamber 019 while being in parallel to a vertical plane containing the cylinder side opening 034 of the second communication passage, the center line of the cylinder, and the exhaust opening 018. Of the mist of the rich air-fuel mixture depicted by the arrows 060, a portion of the mist depicted by the solid arrows has a large forward traveling force by injection. The mist identified by the solid arrows travels along approximately straight lines. A portion of the mist depicted by the broken lines has a weakened forward traveling force, and travels along curved lines. The mist of the fuel directed upwardly is reversed in the vicinity of the semi-spherical ceiling of the combustion chamber and is directed downwardly, to form longitudinal eddies in the combustion chamber in cooperation with existing scavenging eddies 061. The scavenging eddies 061 are longitudinal eddies generated as follows: namely, air flows of schnurle scavenging (reverse scavenging) performed by scavenging air supplied from the scavenging passages 013 and 015 and an exhaust gas discharged from the exhaust passage 017 form swirl flows within a vertical plane containing the exhaust opening 018 and the center line of the cylinder.

In the internal combustion engine of this type, scavenging only by air is performed in the initial state of scavenging, and fuel (rich air-fuel mixture) injected into the combustion chamber as described above, flows into the combustion chamber which has been sufficiently scavenged with the above-described air, to be mixed with air in the combustion chamber. The air-fuel mixture thus adjusted at a suitable air-fuel ratio is then burned in the combustion chamber.

In the above-described background art internal combustion engine, the mist of fuel is injected toward the ignition plug 020 within the vertical plane containing the exhaust opening 018 and the center line of the cylinder 005, and the mist of fuel forms longitudinal eddies in cooperation with the existent scavenging eddies in the combustion chamber 019. The eddy currents within the vertical plane are kept until the eddies are destroyed to be finely dispersed at the final stage in the compression stroke.

It is required to sufficiently uniformly and speedily mix intake air by scavenging with a large amount of a rich air-fuel mixture over the entire region of the inside of the combustion chamber, particularly, at the time of full load operation. However, since the above-described longitudinal eddies are not destroyed until the final stage in the compression stroke, the mixture in the combustion chamber tends to become insufficient.

Furthermore, at the time of full load operation, since a rich air-fuel mixture is blown toward the ignition plug, the ignition plug is liable to be fogged with the rich air-fuel mixture, with a result that it becomes difficult to realize desirable combustion.

SUMMARY OF THE INVENTION

An object of the present invention is to solve the problems of the above-described background art internal combustion engine, and to provide a two-cycle internal combustion engine capable of sufficiently, speedily mixing intake air (air) with a rich air-fuel mixture before a piston is moved up, and preventing an ignition plug from being fogged with a rich air-fuel mixture.

To solve the above-described problems, according to the present invention, there is provided a two-cycle internal combustion engine including: a cylinder; an exhaust opening provided in a portion, on one side in the peripheral direction, of the cylinder; a plurality of scavenging openings for performing schnurle scavenging, the scavenging openings being located at positions which are laterally symmetric with respect to a cylinder symmetric plane containing the exhaust opening and the center line of the cylinder while excluding the position of the exhaust opening; a chamber portion adjacent to the cylinder; a communication passage for communicating the cylinder to the chamber portion, the communication passage having a cylinder side opening located opposite to the exhaust opening with respect to the center line of the cylinder; and a control valve for openably/closably controlling the communication passage so as to blow a rich air-fuel mixture into a combustion chamber from the cylinder side opening of the communication passage by a high compression gas stored in the chamber portion. The above two-cycle internal combustion engine is characterized as follows:

(1) Side walls of a cylinder side passage portion of the communication passage are tilted with respect to the cylinder symmetric plane (containing the exhaust opening and the center line of the cylinder) in order to deflect mist of the rich air-fuel mixture at least on either the right side or the left side with respect to the cylinder symmetric plane. With this configuration, since the flow of mist of the deflected rich air-fuel mixture obliquely crosses the scavenging eddies, it is possible to destroy the scavenging eddies and hence to accelerate the mixture of the rich air-fuel mixture with air.

(2) In the two-cycle internal combustion engine described in the item (1), one or a plurality of guide vanes for assisting deflection of the flow of the rich air-fuel mixture are provided in the cylinder side passage portion of the communication passage. With this configuration, it is possible to positively deflect the rich air-fuel mixture.

(3) In the two-cycle internal combustion engine described in the item (1), wherein a wedge-shaped partitioning member for branching the flow of mist of the rich air-fuel mixture and side walls of each of the branched passages thus formed are tilted with respect to the cylinder symmetric plane in order to deflect the flow of mist of the rich air-fuel mixture on both sides of the cylinder symmetric plane. With this configuration, since the flow of the rich air-fuel mixture destroys the scavenging eddies from the right and left sides, it is possible to positively destroy the scavenging eddies.

(4) In the two-cycle internal combustion engine described in the item (1), a wedge-shaped partitioning member for branching the flow of mist of the rich air-fuel mixture is provided in the cylinder side passage portion of the communication passage while being offset to either the right side or the left side and side walls of each of the branched passages thus formed are tilted with respect to the cylinder symmetric plane, in order to deflect the flow of mist of the rich air-fuel mixture on both sides of the cylinder symmetric plane with flow quantities of the branched flows of the rich air-fuel mixture being made different from each other. With this configuration, it is possible to obtain the same effect as that described in the item (3).

(5) In the two-cycle internal combustion engine described in the item (1), side walls of a passage formed in the control valve are tilted in such a direction as to assist the deflection of the injecting direction of the rich air-fuel mixture. With this configuration, it is possible to prevent an ignition plug from being fogged with the rich air-fuel mixture.

(6) In the two-cycle internal combustion engine described in the item (1), a wall of the cylinder side passage portion of the communication passage is tilted so as to ensure the height of the injecting direction of the rich air-fuel mixture allowing the injected rich air-fuel mixture to be directed to a connecting portion between the cylinder and the cylinder head. With this configuration, it is possible to prevent the ignition plug from being fogged with the rich air-fuel mixture and to prevent the inner wall of the cylinder from being excessively made wet with the rich air-fuel mixture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a) and 12(b) are sectional views of a rotary valve used in the internal combustion engine shown in FIG. 10, wherein FIG. 12(a) is a longitudinal sectional view of the rotary valve, and FIG. 12(b) is a sectional view taken on line I—I of FIG. 12(a);

DESCRIPTION OF THE PREFERRED EMBODIMENTS

Figure 1:
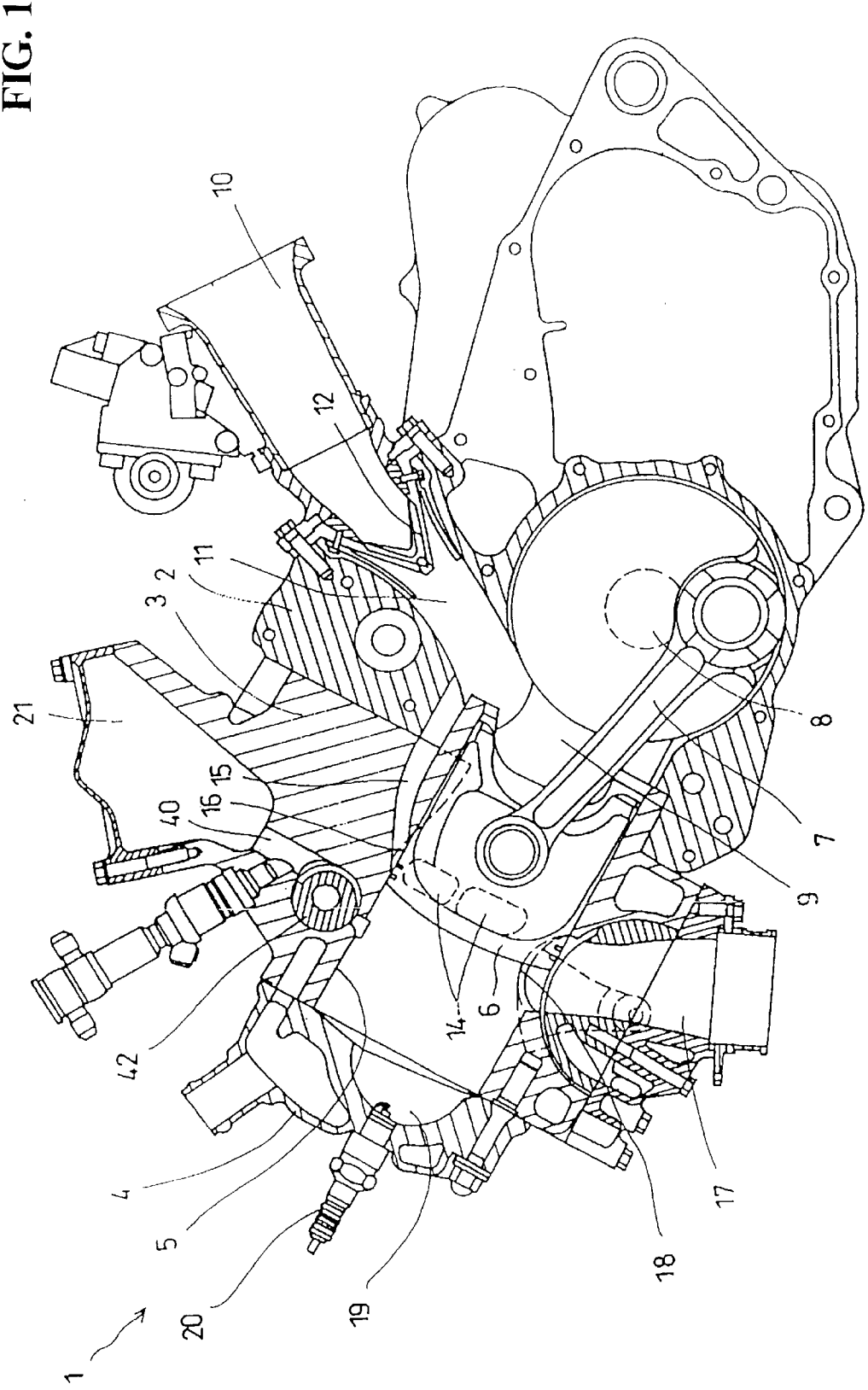
FIG. 1 is a longitudinal sectional view of a first embodiment of a two-cycle internal combustion engine according to the present invention.
Figure 2:
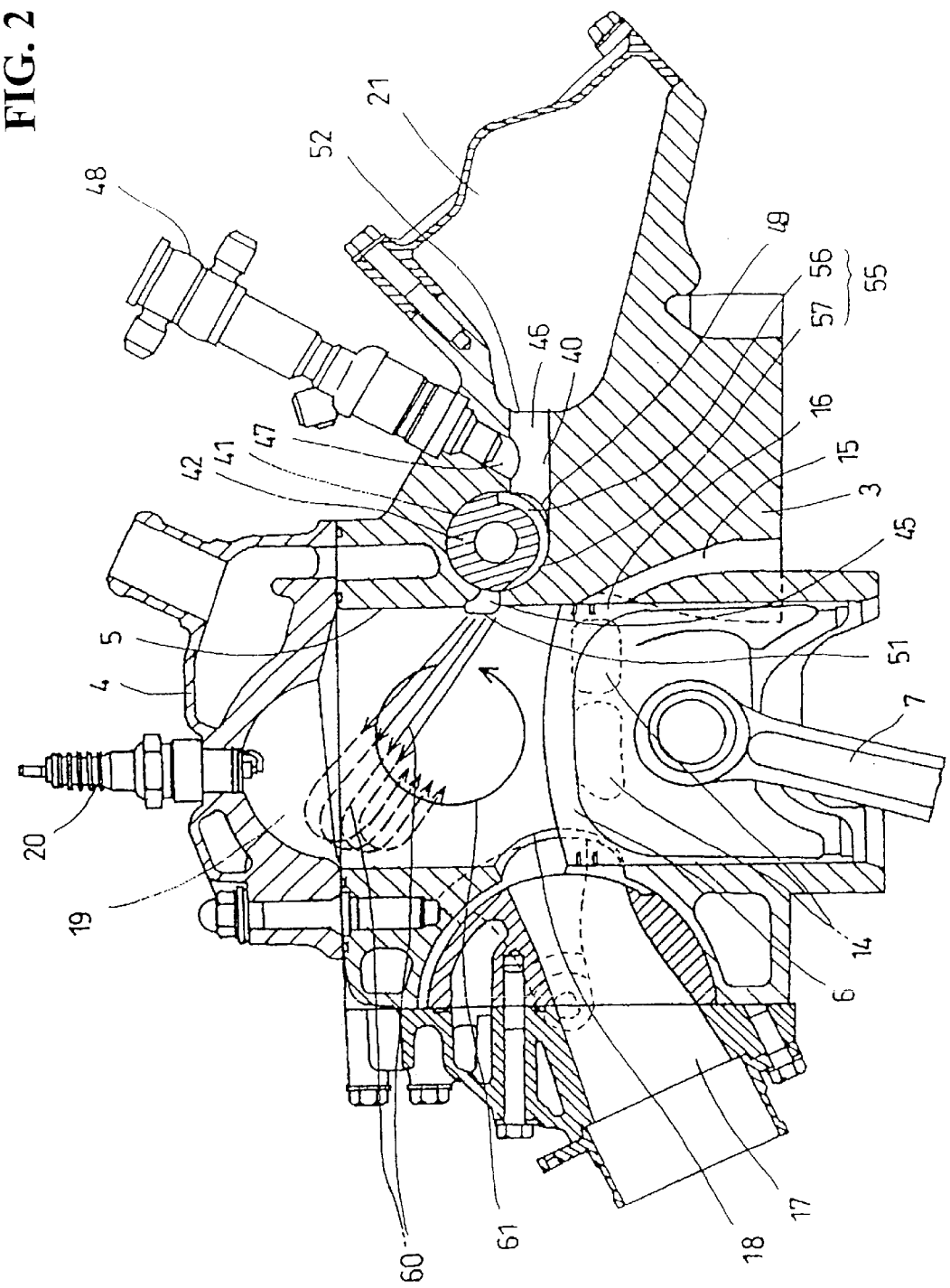
FIG. 2 is an enlarged longitudinal sectional view of an essential portion of the first embodiment.
Figure 3:
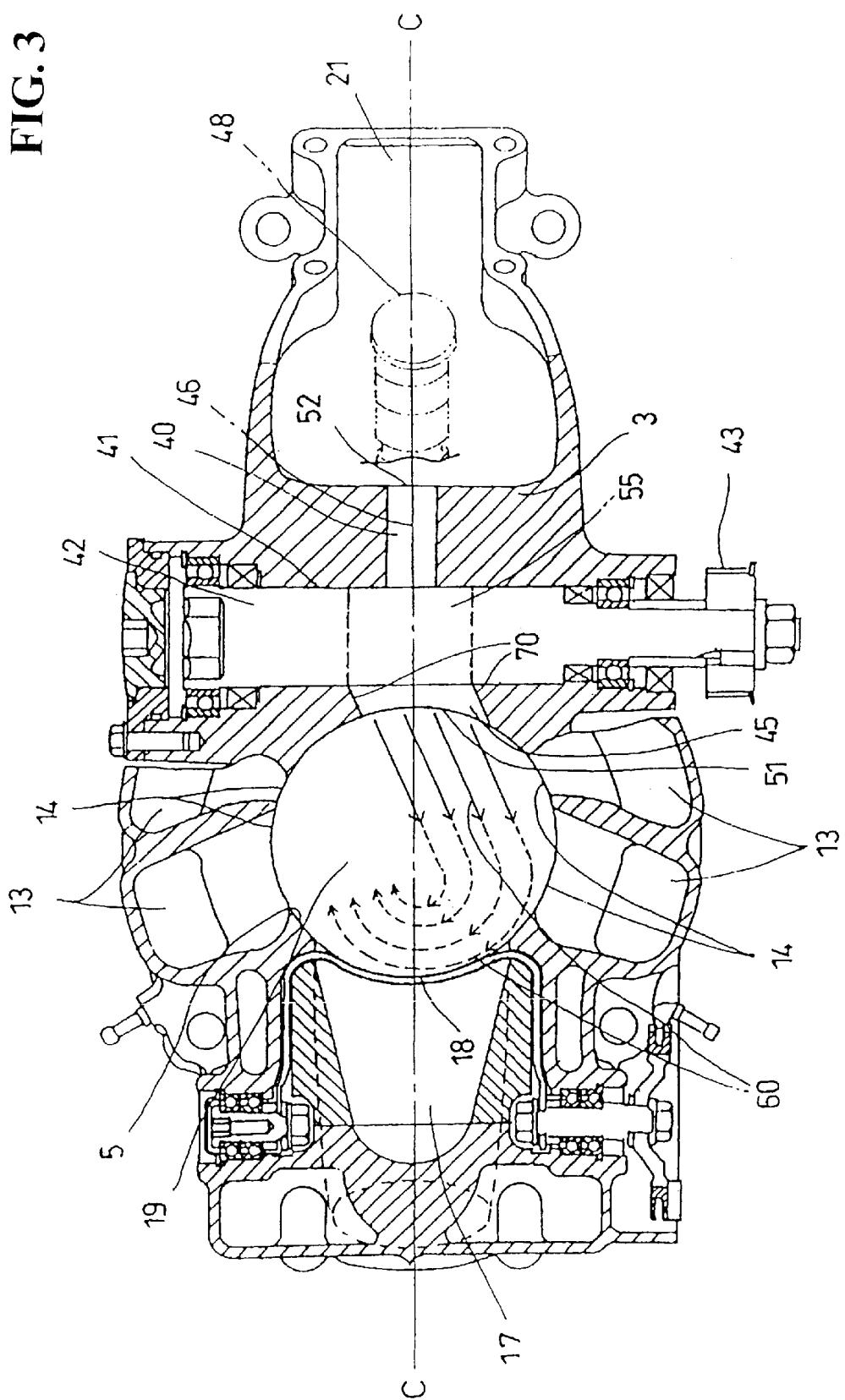
FIG. 3 is an enlarged horizontal sectional view of an essential portion of the first embodiment.

FIG. 1 is a longitudinal sectional view of a first embodiment of a two-cycle internal combustion engine of the present invention; FIG. 2 is an enlarged longitudinal sectional view of an essential portion of the engine shown in FIG. 1; and FIG. 3 is an enlarged horizontal sectional view of an essential portion of the engine shown in FIG. 1.

Referring to FIG. 1, a two-cycle internal combustion engine 1 is mountable to a motorcycle (not shown), wherein a cylinder block 3 and a cylinder head 4 are sequentially stacked on a crankcase 2 and are integrally jointed to each other.

A piston 6 is vertically slidably fitted in a cylinder 5 formed in the cylinder block 3. The piston 6 is connected to a crankshaft 8 via a connecting rod 7, whereby the crankshaft 8 is rotated along with upward/downward movement of the piston 6.

An intake passage 10 extending from the rear side to the front side of the vehicular body is connected to an intake passage 11 of the crankcase 2. A throttle valve (not shown) and a reed valve 12 are interposed in series in the intake passage 11. The throttle valve is connected to a throttle grip (not shown) via a connecting means (not shown). The opening degree of the throttle valve is increased by twisting the throttle grip in one direction.

An exhaust passage 17 having an exhaust opening 18 is provided in a portion, on one side in the peripheral direction, of the cylinder block 3. A chamber portion 21 is provided in a portion, on the side remote from the exhaust passage 17, of the cylinder block 3.

Referring to FIGS. 1 and 3, two pairs of right and left scavenging passages 13 for communicating an upper portion of the cylinder 5 to a crank chamber 9 are formed in the crankcase 2 and the cylinder block 3. Each pair of the scavenging passages 13 are for supplying air, and have scavenging openings 14 which are opened at positions laterally symmetric with respect to a plane containing the exhaust opening 18 and the center line of the cylinder 5. A scavenging passage 15 for supplying air is also formed in the crankcase 2 and the cylinder block 3. The scavenging passage 15 has a scavenging opening 16, which is opened at a position opposite to the exhaust opening 18 of the cylinder 5. That is to say, five pieces of the scavenging passages for supplying air are formed in the crankcase 2 and the cylinder block 3. The scavenging passage 15 for supplying air is directly connected to a portion, on the downstream side from the reed valve 12, of the intake passage 11 of the crankcase 2. Schnurle scavenging is performed by air blown from these scavenging passages. As shown in FIG. 1, the exhaust opening 18 extends to a position higher than the scavenging openings 14 and 16. An approximately semispherical combustion chamber 19 disposed over the cylinder 5 is offset toward the exhaust opening 18. An ignition plug 20 is mounted to the combustion chamber 19.

Referring to FIGS. 2 and 3, a communication passage 40 for communicating an upper portion of the cylinder 5 to the chamber portion 21 is provided in the cylinder block 3. A valve housing hole 41 is provided in such a manner as to cross a mid portion of the communication passage 40. A rotary valve 42 is rotatably mounted in the valve housing hole 41. The rotary valve 42 is rotated at the same rotational speed as that of the crankshaft 8 in the rotational direction (clockwise in FIG. 1) reversed to the rotational direction of the crankshaft 8 by a transmission mechanism (not shown). Reference numeral 43 designates a pulley mounted to one end of the rotary valve 42. The transmission mechanism (not shown) is wound around the pulley 43.

The communication passage 40 is commonly used for allowing a high compression gas to flow from the combustion chamber 19 into the chamber portion 21, and for allowing an air-fuel mixture and the high compression gas to flow from the chamber portion 21 into the combustion chamber 19. The communication passage 40 is composed of a cylinder side passage portion 45 and a chamber portion side passage portion 46, which are disposed with a control portion of the rotary valve 40 located therebetween. Reference numeral 51 designates a cylinder side opening of the communication passage 40, and 52 is a chamber portion side opening of the communication passage 40. A fuel injector 48 is connected to the chamber portion side portion 46 of the communication passage 40 via a connecting passage 47 extending obliquely rearwardly from the chamber portion side passage portion 46.

Referring to FIG. 2, a control valve 55 is formed in the rotary valve 42. The control valve 55 has a portion forming a second control valve 57 and a portion forming a first control valve 56, which are continuously disposed in this order from the front side in the rotational direction. The second control valve 57 is operative for controlling the injection of an air-fuel mixture in the direction from the chamber portion 21 to the combustion chamber 19. The first control valve 56 is operative for controlling the flow of a high compression gas in the direction from the combustion chamber 19 to the chamber portion 21.

The switching from the flow of an air-fuel mixture to the flow of a high compression gas by the rotary valve 42 is dependent on a balancing relationship between a pressure in the combustion chamber 19 and a pressure in the chamber portion 21 because the communication passage 40 is taken as the common communication passage. To be more specific, when the pressure in the combustion chamber 19 becomes higher than the pressure in the chamber portion 21, the flow in the communication passage 40 is switched from flow of the air-fuel mixture into flow of the high compression gas. Nearly at this time, the flow control of the air-fuel mixture by the second control valve 57 is shifted to the flow control of the high compression gas by the first control valve 56.

Referring to FIG. 2, a portion formed into a crescent shape in cross-section, designated by reference numeral 49, is a fuel sump recess provided in the cylinder block 3 at a boundary between the inner wall of the communication passage 40 and the outer peripheral surface of the rotary valve 42. Fuel, which has been impinged on the inner wall of the chamber portion side passage portion 46 of the communication passage 40, and has reached the second control valve 57, is captured in the fuel sump recess 49 until the second control valve 42 is opened. Accordingly, it is possible to positively supply fuel into the combustion chamber at the beginning of opening of the control valve without the occurrence of counterflow of fuel to the chamber portion 21 side.

An air-fuel mixture is formed as follows: namely, fuel is injected from the fuel injector 48 onto an inner wall surface of the chamber portion side passage portion 46 of the communication passage 40 before the second control valve 57 opens the communication passage 40. When the second control valve 57 opens the communication passage 40, a high compression gas charged in the chamber portion 21 flows from the chamber portion side opening 52 of the communication passage 40, to be mixed with the standby fuel. A rich air-fuel mixture thus formed is then press-fed by the high compression gas into the chamber portion 21, to be injected from the cylinder side opening 51 of the communication passage 40 into the combustion chamber 19. Thereafter, at a point of time when the rotation of the rotary valve 42 advances and the first control valve 56 opens the communication passage 40, a high compression gas is charged from the combustion chamber 19 into the chamber portion 21, to be used for the next press-feeding of fuel.

According to this embodiment, in order to deflect the injecting direction of the rich air-fuel mixture 60 to either the rightward direction or the leftward direction, side walls of the cylinder side passage portion of the communication passage are tilted with respect to a cylinder symmetric plane (containing the exhaust opening and the center line of the cylinder). FIG. 3 shows a state in which side walls 70 of the cylinder side passage portion 45 of the communication passage are tilted leftwardly with respect to a center line C—C representing the above cylinder symmetric plane in order to deflect the injecting direction of the rich air-fuel mixture to the leftward direction. The injecting direction of the rich air-fuel mixture may be deflected to the rightward direction. In addition, the height of the injecting direction of the rich air-fuel mixture is set such that the injected rich air-fuel mixture is directed toward a connecting portion between the cylinder and the cylinder head.

Figure 4A:
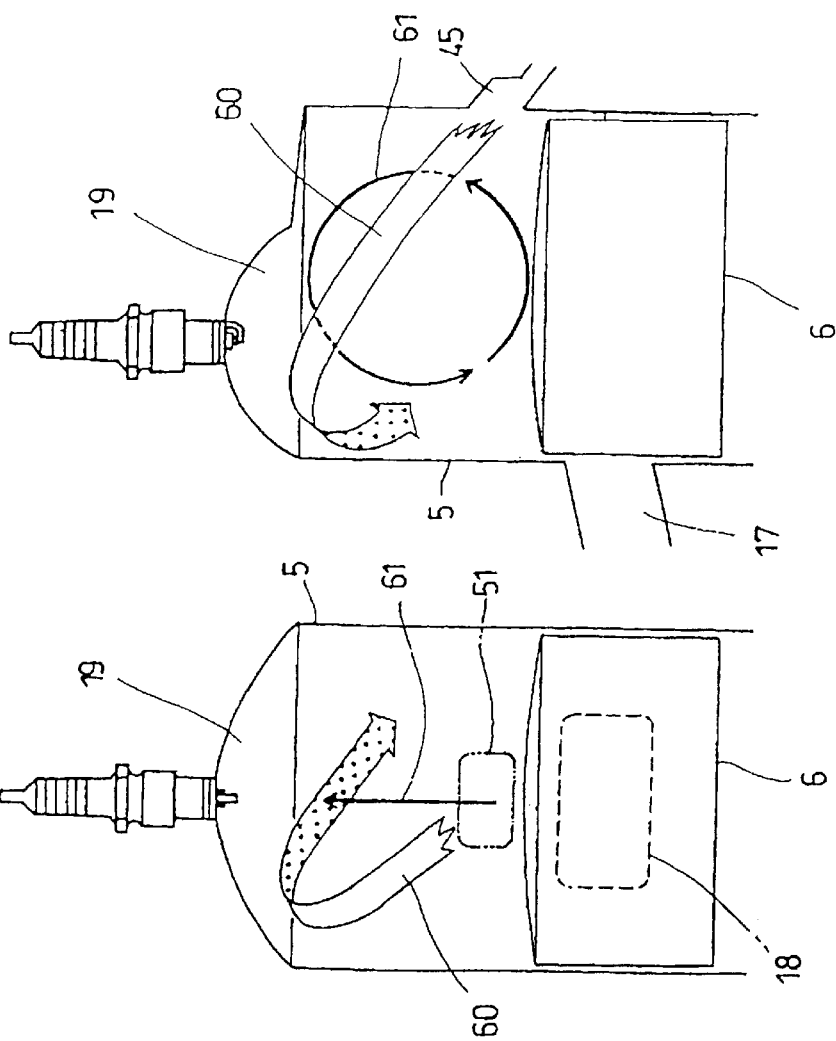
FIGS. 4(a) to 4(c) are views illustrating the flow of gas in a combustion chamber of the first embodiment.
Figure 4B:
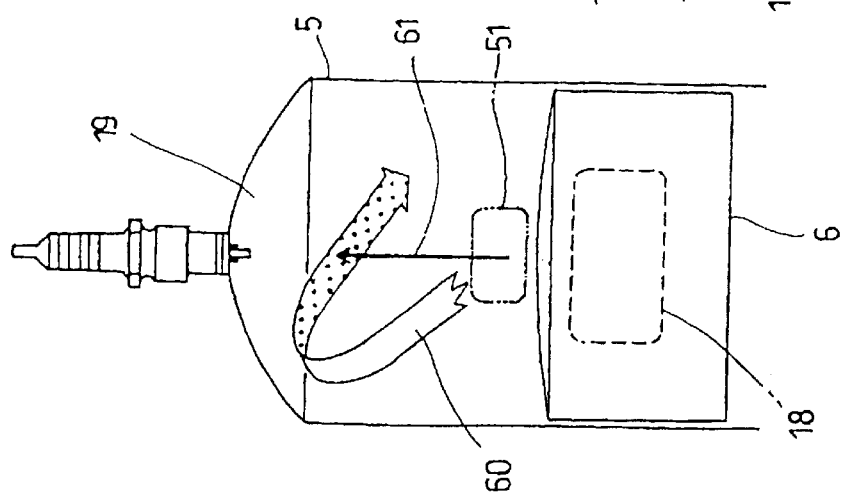
Figure 4C:
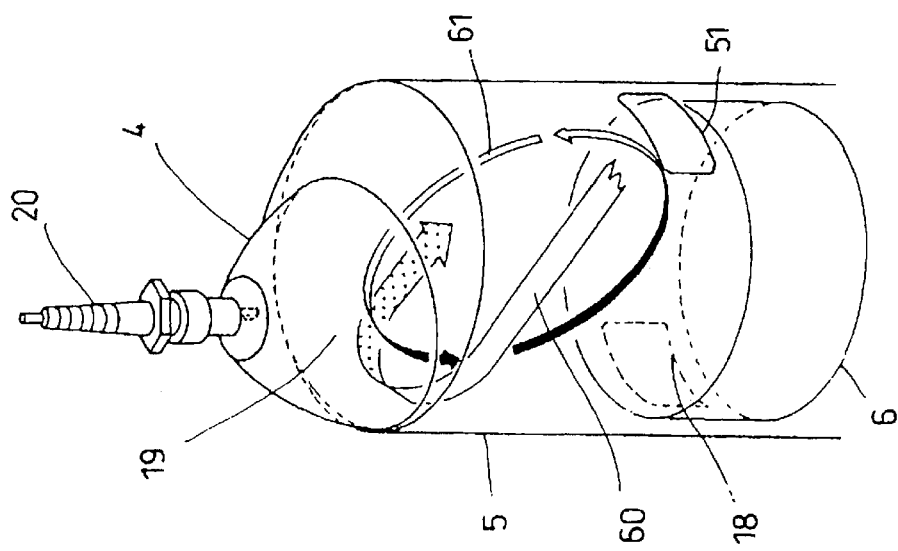

FIGS. 4(a) to 4(c) are illustrative views showing a positional relationship between the flow of the rich air-fuel mixture 60 and the flow of the scavenging eddies 61, wherein FIG. 4(a) is a perspective view of the internal combustion engine as seen from a point offset obliquely rearwardly, slightly upwardly from the engine; FIG. 4(b) is a perspective rear view of the engine; and FIG. 4(c) is a perspective side view of the engine. As is apparent from these views, the flow of the injected rich air-fuel mixture 60 obliquely crosses the flow of the scavenging eddies 61, which travel in the direction reversed to the traveling direction of the flow of the injected rich air-fuel mixture 60. Accordingly, the scavenging eddies 61 are destroyed before the piston 6 is moved up and thereby the flow of the scavenging eddies 61 is disturbed. As a result, it is possible to accelerate the uniform mixture of the rich air-fuel mixture with air over the entire region of the inside of the combustion chamber, and hence to realize desirable combustion. Furthermore, since the flow of the rich air-fuel mixture 60 is not directly impinged on the ignition plug 20, it is possible to prevent the ignition plug 20 from being fogged with the rich air-fuel mixture.

In addition, if the height of the injecting direction of the rich air-fuel mixture is set such that the injected rich air-fuel mixture is directed to the ceiling of the combustion chamber, the ignition plug is fogged with the rich air-fuel mixture. On the other hand, if the height of the injecting direction of the rich air-fuel mixture is set to be excessively lower, the inner wall of the cylinder becomes wet with the rich air-fuel mixture. This may result in the occurrence of desirable combustion not being possible, and lubricating oil being carried away with the exhaust. For this reason, the height of the injecting direction of the rich air-fuel mixture is preferably set such that the injected rich air-fuel mixture is directed to a connecting portion between the cylinder and the cylinder head.

Figure 5:
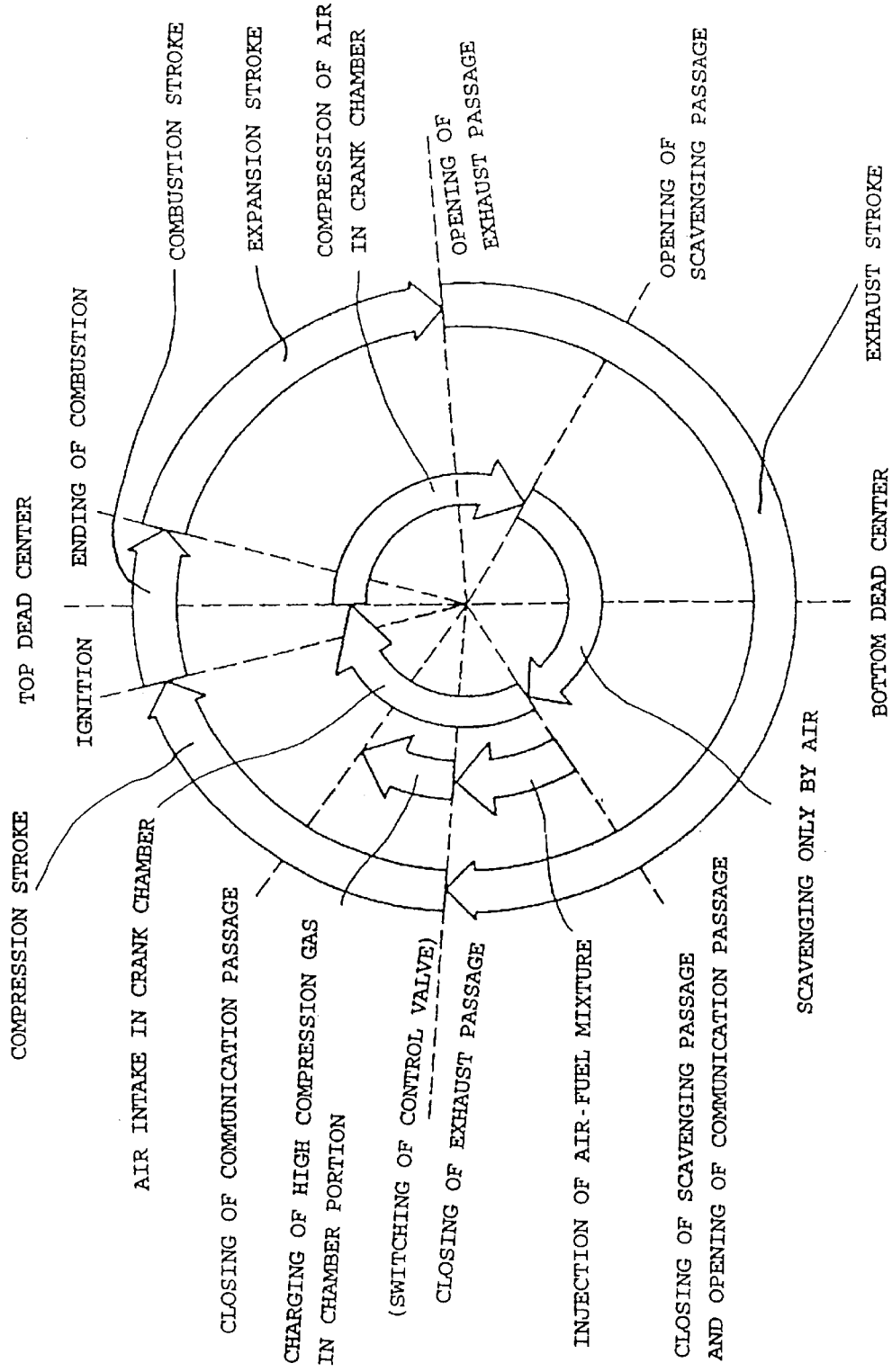
FIG. 5 is a diagram illustrating an operational cycle of the first embodiment.

The two-cycle internal combustion engine 1 configured as described above is operated in accordance with an operational cycle shown in FIG. 5. As the crankshaft 8 is rotated counterclockwise in FIG. 1 by a starter motor (not shown), the piston 6 is moved up in the cylinder 5. At a point of time of about 58° past the bottom dead center, the scavenging openings 14 and 16 for supplying air are closed by upward movement of the piston 6, to stop the scavenging by the flow-in of air through the scavenging passages 13 and 15. Furthermore, nearly from this point of time, the second control valve 57 opens the communication passage 40 to inject an air-fuel mixture from the opening 51 into the combustion chamber 19, thereby scavenging the residual burnt gas, and at the same time, air is sucked from the intake passages 10 and 11 into the crank chamber 9 via the reed valve 12 by expansion of the crank chamber 9 due to upward movement of the piston 6.

At a point of time of 90° before the top dead center, the exhaust opening 18 is closed by the piston 6, so that the operational cycle enters a compression stroke. Nearly at this point of time, the control valve is switched from the second control valve 57 into the first control valve 56, whereby the supply of the air-fuel mixture in the combustion chamber 19 is ended and a high compression gas in the combustion chamber 19 is charged into the chamber portion 21 via the communication passage 40.

At a point of time of 75° before the top dead center, the first control valve 56 is closed to close the communication passage 40. Furthermore, the opening 51 is closed by the piston 6, to thereby end the charging of the high compression gas into the chamber portion 21.

The combustion chamber 19 is further compressed, and at a specific timing before the top dead center, the ignition plug 20 is ignited. Meanwhile, the crank chamber 9 continues to be expanded by upward movement of the piston 6, to continue air suction until the piston 6 reaches the top dead center.

After the piston 6 reaches the top dead center, the air-fuel mixture in the combustion chamber 19 is burned and is expanded. Furthermore, the crank chamber 9 is compressed by downward movement of the piston 6, to compress the air in the crank chamber 9.

At a point of time of 90° past the top dead center, the exhaust opening 18 is opened, whereby the burned gas is discharged from the exhaust passage 17.

At a point of time of about 122° past the top dead center, the scavenging openings 14 and 16 are opened by downward movement of the piston 6, whereby the compressed air (containing no fuel) in the crank chamber 9 flows in the combustion chamber 19 via the scavenging passages 13 and 15 for supplying air, to push the burned gas in the combustion chamber 19 toward the exhaust opening 18, thereby performing scavenging only by air. At the same time, fuel is injected from the fuel injector 48 onto the inner wall surface of the chamber portion side passage portion 46 of the communication passage 40.

At a point of time of about 58° past the bottom dead center, the scavenging by the flow-in of air from the scavenging passages 13 and 15 is stopped, and the second control valve 57 opens the communication passage 40, to inject the air-fuel mixture into the combustion chamber 19, thereby scavenging the residual burnt gas. At the same time, air is sucked into the crank chamber 9 via the intake passages 10 and 11. The operational cycle is thus ended.

Figure 6:
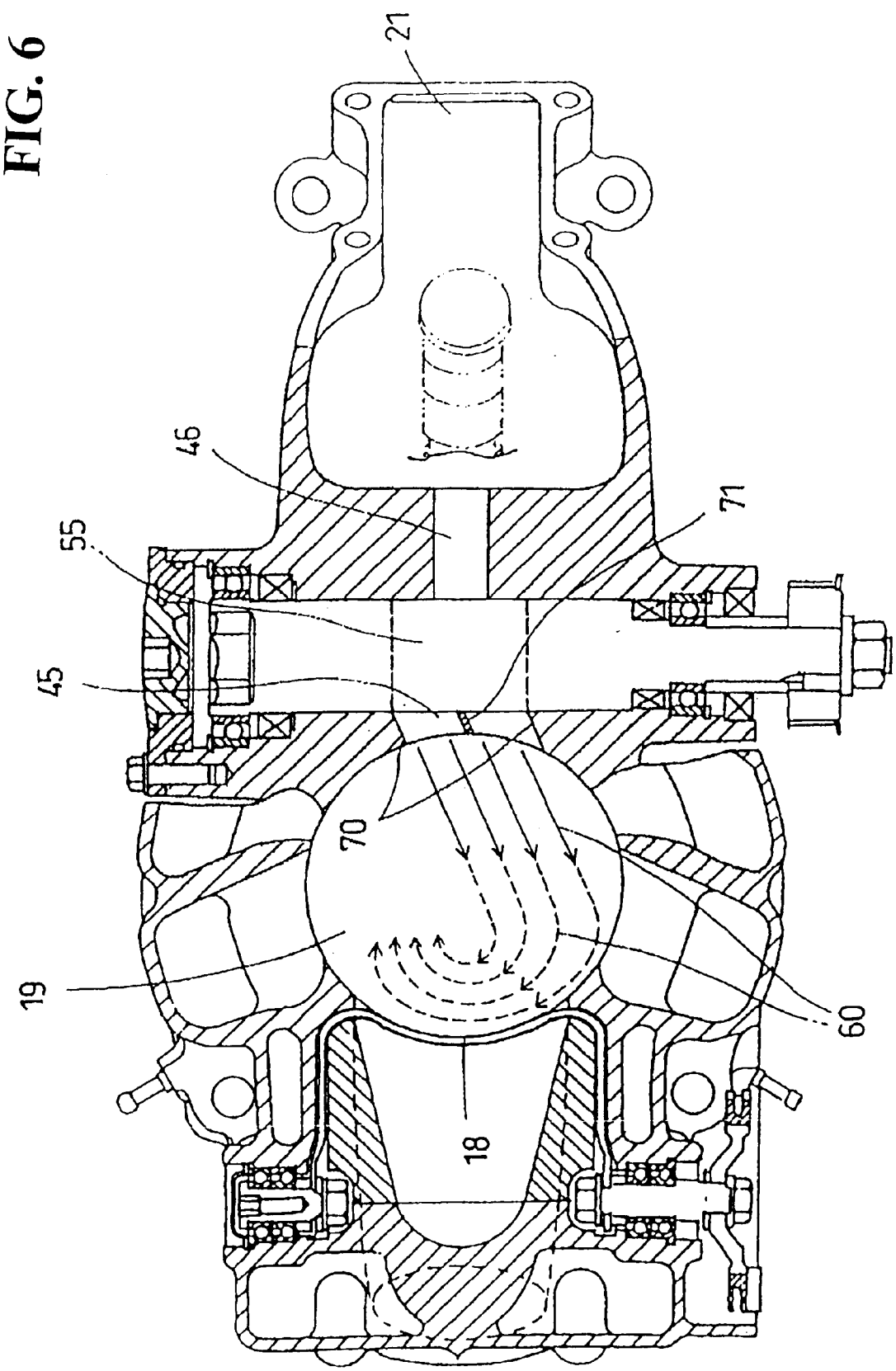
FIG. 6 is a horizontal sectional view of an essential portion of a second embodiment of the two-cycle internal combustion engine according to the present invention.

FIG. 6 is a horizontal sectional view of a second embodiment of the two-cycle internal combustion engine of the present invention. According to this embodiment, like the first embodiment, it is intended to deflect mist of a rich air-fuel mixture on either the right side or the left side in the cylinder. According to this embodiment, side walls 70 of a cylinder side passage portion 45 of a communication passage are tilted with respect to the cylinder symmetric plane (containing an exhaust opening, the center line of a cylinder, and the cylinder side opening of the communication passage). Furthermore, a guide vane 71 as a baffle wall for deflecting the flow of the rich air-fuel mixture is provided in the cylinder side passage portion 45 of the communication passage. With this configuration, it is possible to positively deflect the flow of the rich air-fuel mixture, and hence to accelerate the mixture of the rich air-fuel mixture with air and prevent the fogging of the ignition plug with the rich air-fuel mixture. While the injecting direction of the rich air-fuel mixture is set to the leftward direction in FIG. 6, it may be set to the rightward direction. Although only one guide vane is shown in the figure, a plurality of guide vanes may be provided. The configurations and functions of parts other than those described above are the same as those of the corresponding parts in the first embodiment.

Figure 7:
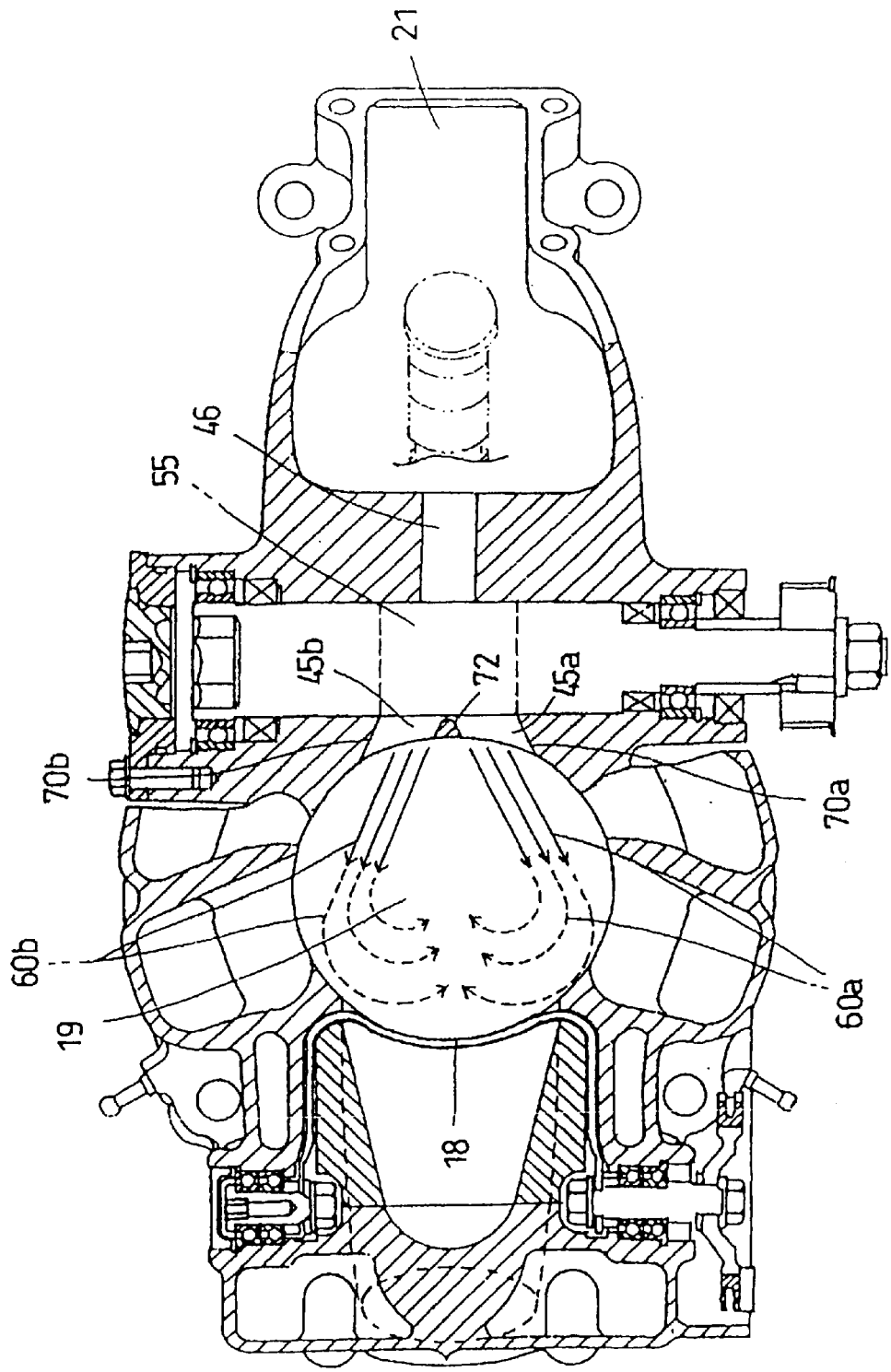
FIG. 7 is a horizontal sectional view of an essential portion of a third embodiment of the two-cycle internal combustion engine according to the present invention.

FIG. 7 is a horizontal sectional view of a third embodiment of the two-cycle internal combustion engine of the present invention. According to this embodiment, it is intended to deflect mist of a rich air-fuel mixture on the rightward and leftward directions in a cylinder with the flow quantities of the deflected parts of the rich air-fuel mixture being nearly equal to each other. To achieve such an object, a wedge-shaped partitioning member 72 for branching the flow of the rich air-fuel mixture into two parts is provided in a central portion of a cylinder side passage portion 45 of a communication passage. The cylinder side passage portion 45 is divided into two passages 45a and 45b by the partitioning member 72. Side walls 70a of the passage 45a are leftwardly tilted with respect to the cylinder symmetric plane and side walls 70b of the passage 45b are rightwardly tilted with respect to the cylinder symmetric plane in order to deflect a flow 60a of the rich air-fuel mixture injected from the passage 45a leftwardly and deflect a flow 60b of the rich air-fuel mixture injected from the passage 45b rightwardly. According to this embodiment, since the injected flow 60 of the rich air-fuel mixture is not directly impinged on the ignition plug, it is possible to prevent the fogging of the ignition plug with the rich air-fuel mixture. Furthermore, since the injected flow of the rich air-fuel mixture exerts, from the right and left sides, an effect on scavenging eddies to destroy the scavenging eddies, it is possible to accelerate the mixture of the rich air-fuel mixture with air. The configurations and functions of parts other than those described above are the same as those of the corresponding parts in the first embodiment.

Figure 8:
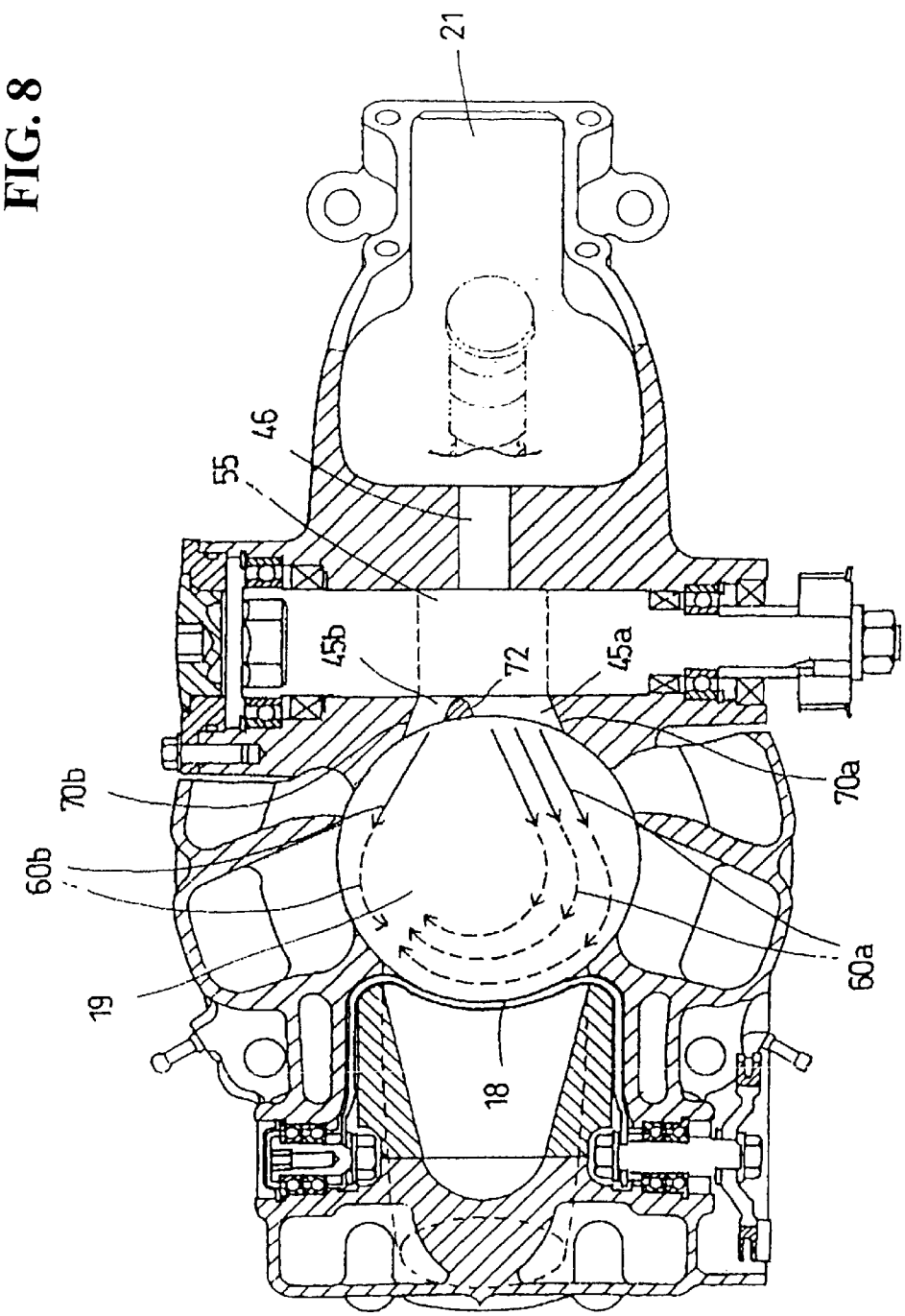
FIG. 8 is a horizontal sectional view of an essential portion of a fourth embodiment of the two-cycle internal combustion engine according to the present invention.

FIG. 8 is a horizontal sectional view of a fourth embodiment of the two-cycle internal combustion engine of the present invention. According to this embodiment, it is intended to deflect mist of a rich air-fuel mixture on the right and left sides in a cylinder in such a manner that the flow quantity of the deflected part on one of the right and left sides is set to be larger than that of the deflected part on the other side. To achieve such an object, a wedge-shaped partitioning member 72 for branching the flow of the rich air-fuel mixture into two parts is provided in a cylinder side passage portion 45 of a communication passage in such a manner as to be offset to one of the right and left sides. As a result, the cylinder side passage portion 45 of the communication passage is divided into two passages 45a and 45b different in volume from each other. Furthermore, side walls 70a of the passage 45a are leftwardly tilted with respect to the cylinder symmetric plane and side walls 70b of the passage 45b are rightwardly tilted with respect to the cylinder symmetric plane. With this configuration, a large quantity of a flow 60a of the rich air-fuel mixture and a small quantity of a flow 60b of the rich air-fuel mixture are formed. According to this embodiment, since the injected flow 60 of the rich air-fuel mixture is not directly impinged on the ignition plug, it is possible to prevent the fogging of the ignition plug with the rich air-fuel mixture. Furthermore, since the injected flow of the rich air-fuel mixture exerts, from the right and left sides, an effect on scavenging eddies to destroy the scavenging eddies as in the third embodiment, it is possible to accelerate the mixture of the rich air-fuel mixture with air. In addition, although the flow deflected on the left side is set as the flow of a large quantity in FIG. 8, the flow deflected on the right side may be set as the flow of a large quantity. The configurations and functions of parts other than those described above are the same as those of the corresponding parts in the first embodiment.

Figure 9:
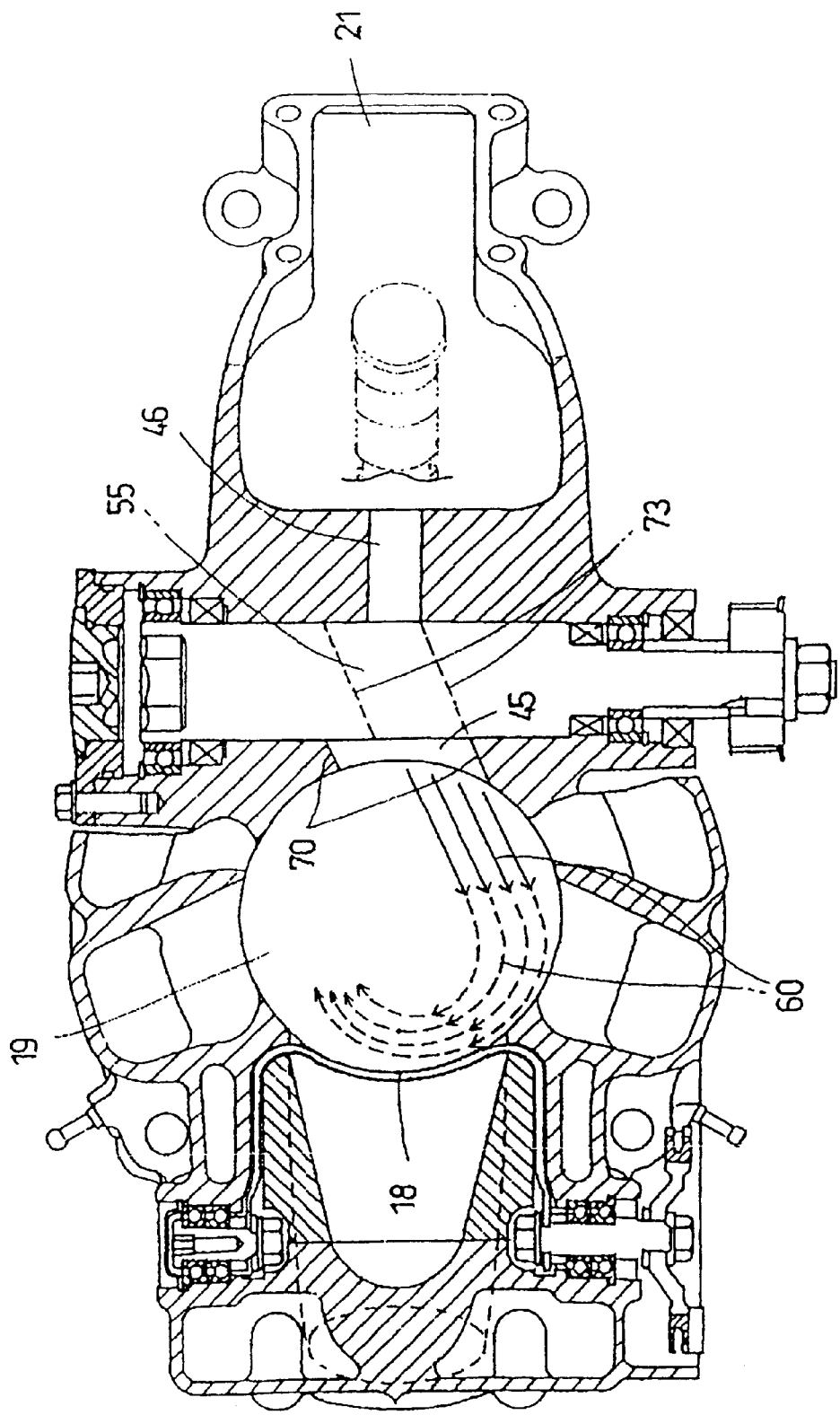
FIG. 9 is a horizontal sectional view of an essential portion of a fifth embodiment of the two-cycle internal combustion engine according to the present invention.

FIG. 9 is a horizontal sectional view of a fifth embodiment of the two-cycle internal combustion engine of the present invention. According to this embodiment, as in the first embodiment, it is intended to deflect mist of a rich air-fuel mixture on either the right side or the left side in a cylinder. In general, to deflect a fluid, a tilted passage on the outlet side is required to be made as long as possible. In the above-described first to fourth embodiments, the length of the tilted passage is set to be long enough to deflect the flow of the rich air-fuel mixture. However, it may often fail to ensure a sufficient length of the tilted passage on the basis of, for example, the structural reason of the engine. This embodiment is intended to provide a suitable means to cope with such an inconvenience. As in the first embodiment, side walls 70 of a cylinder side passage portion 45 of a communication passage are tilted with respect to the cylinder symmetric plane. In addition to this configuration, side walls 73 of a passage of a control valve 55 are tilted in the same direction as the tilt direction of the side walls 70 of the cylinder side passage portion 45 of the communication passage. Since the control valve 55 shown in FIG. 9 is formed as a groove in the surface of a cylindrical rotary valve, the passage of the control valve 55 is formed into a spiral shape from the three-dimensional view. According to this embodiment, it is possible to positively deflect the flow of the rich air-fuel mixture, and hence to accelerate the mixture of the rich air-fuel mixture with air and prevent the fogging of an ignition plug with the rich air-fuel mixture. While the injecting direction of the rich air-fuel mixture is set to the leftward direction in FIG. 9, it may be set to the rightward direction.

Figure 10:
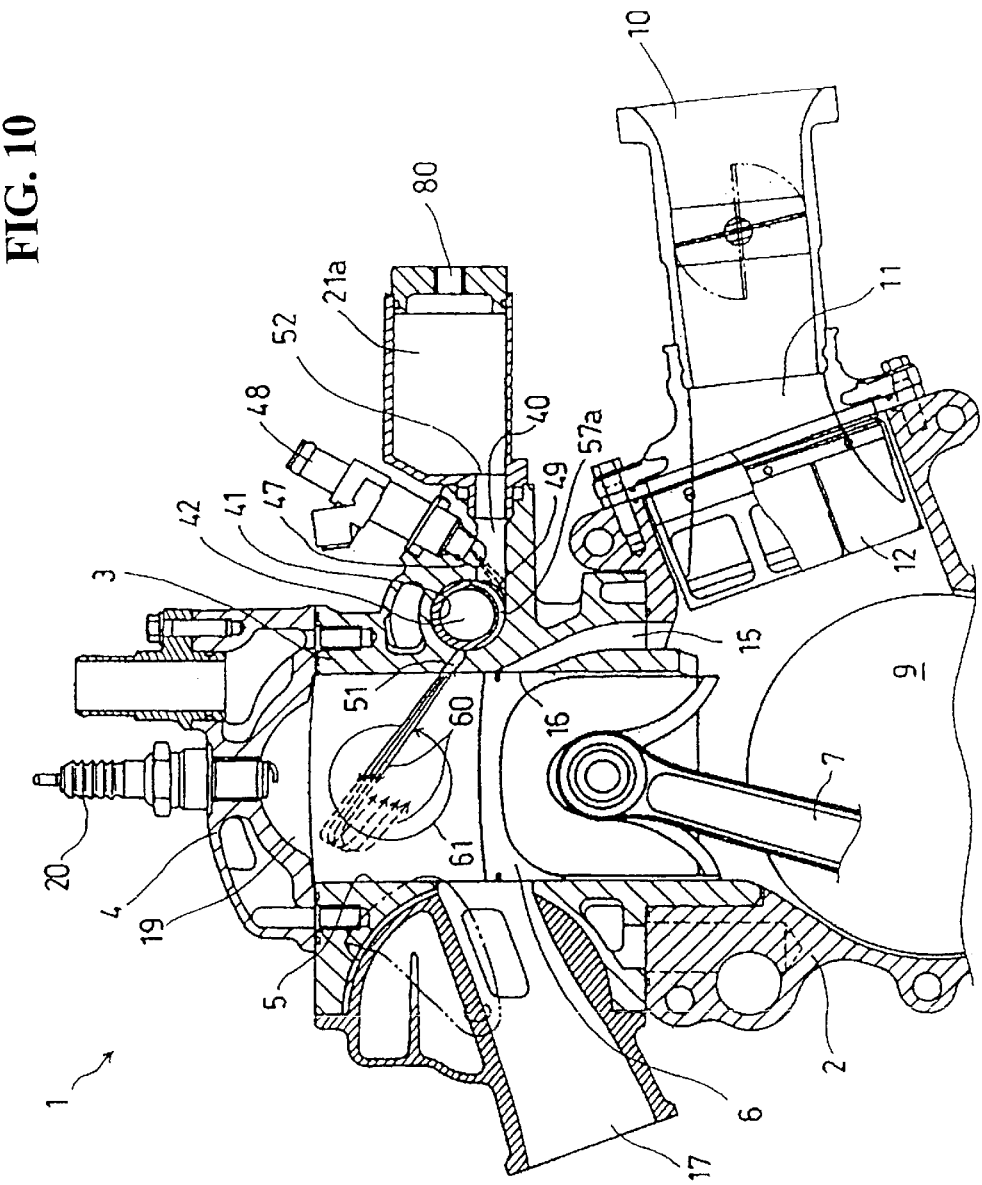
FIG. 10 is a longitudinal sectional view of a two-cycle internal combustion engine according to a sixth embodiment of the present invention.
Figure 11:
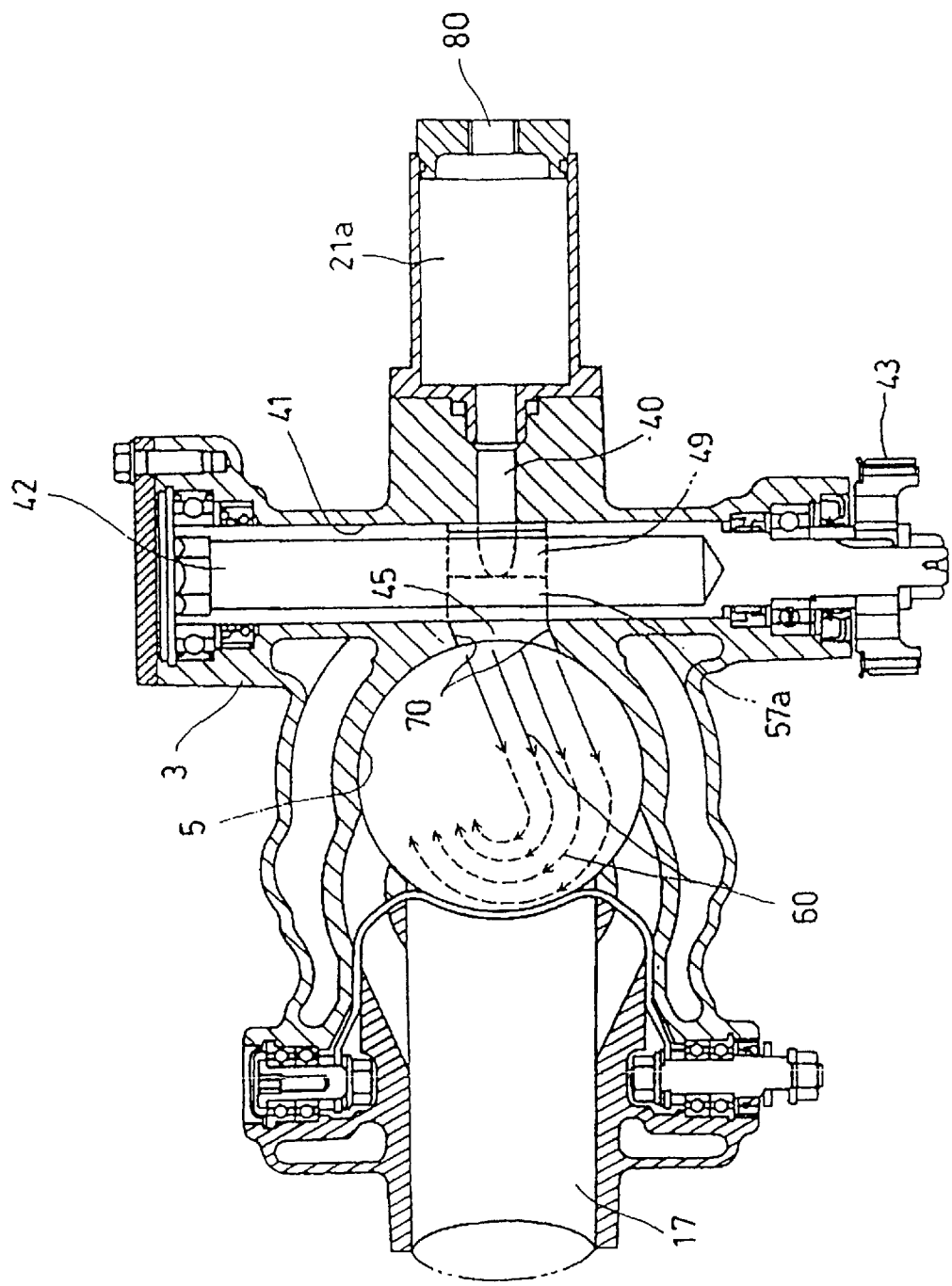
FIG. 11 is a horizontal sectional view of the internal combustion engine shown in FIG. 10.
Figure 12A:
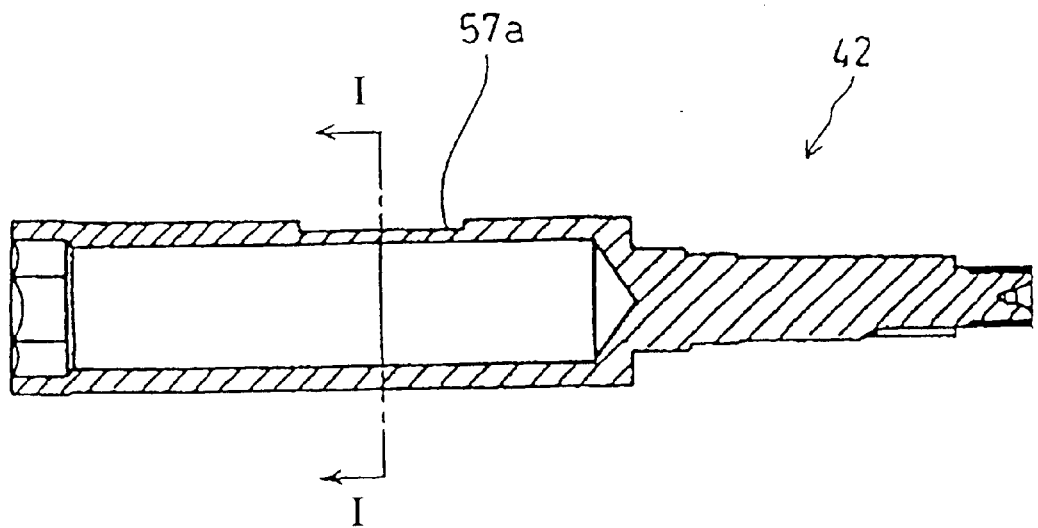
Figure 12B:
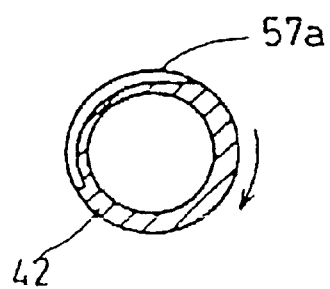

A sixth embodiment of the present invention will be described below. FIG. 10 is a longitudinal sectional view of an essential portion of a spark ignition type two-cycle internal combustion engine according to the sixth embodiment of the present invention; FIG. 11 is a horizontal sectional view taken on a cross-sectional plane passing through a rotary valve shown in FIG. 10; and FIGS. 12(a) and 12(b) are views showing the rotary valve according to this embodiment.

In the first to fifth embodiments, a high compression gas is supplied from the combustion chamber into the chamber portion via the first control valve 56 of the control valve. However, in this embodiment, the first control valve 56 is omitted and a high compression gas is supplied into the chamber portion by a pump (not shown) separately provided. Accordingly, in this embodiment, only the second control valve 57 is left as the control valve, and therefore, the adjective "second" is omitted and the valve having a function of the second control valve 57 is referred to simply as "control valve 57a".

Referring to FIGS. 10 and 11, a chamber portion 21a is provided in a portion, offset to the rear side of the vehicular body, of a cylinder block 3. Reference numeral 80 designates a pump connection port provided in one end surface of the chamber portion 21a. A pump (not shown) for injecting a high compression gas is connected to the pump connection port. A communication passage 40 for communicating the chamber portion 21a to a cylinder bore 5 is provided in the cylinder block 3.

A valve housing hole 41 is provided in such a manner as to cross a mid portion of the communication passage 40. A rotary valve 42 is rotatably fitted in the valve housing hole 41. The rotary valve 42 is rotated via a pulley 43 mounted to an end portion of the rotary valve 42 by a transmission mechanism (not shown).

FIGS. 12(a) and 12(b) show the rotary valve 42. As shown in these figures, a control valve 57a is formed as a cutout having a specific length in the peripheral direction and also having a specific depth. The control valve 57a has no portion equivalent to the first control valve 56 described in the first embodiment (see FIG. 2) and is configured only by a portion equivalent to the second control valve 57 in the first embodiment. As in the first embodiment, the edges of the cutout functioning as the control valve 57a are formed so as not to be stepped for allowing the air-fuel mixture to be linearly, smoothly sprayed. Fuel is injected from a fuel injector 48 (see FIG. 10) immediately before the control valve 57a opens the communication passage.

Figure 13:
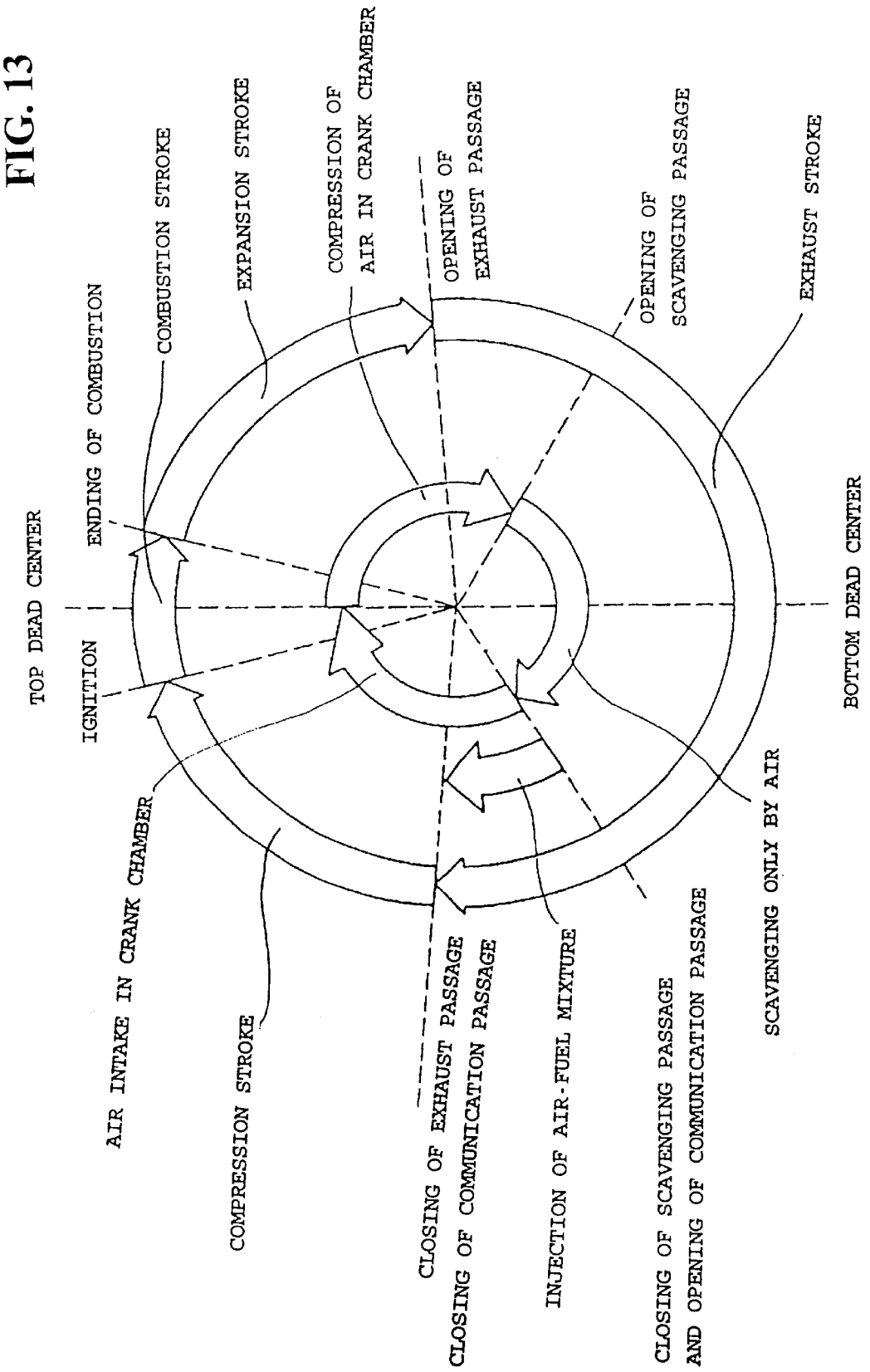
FIG. 13 is a diagram illustrating an operational cycle of the internal combustion engine shown in FIG. 10.
Figure 14:
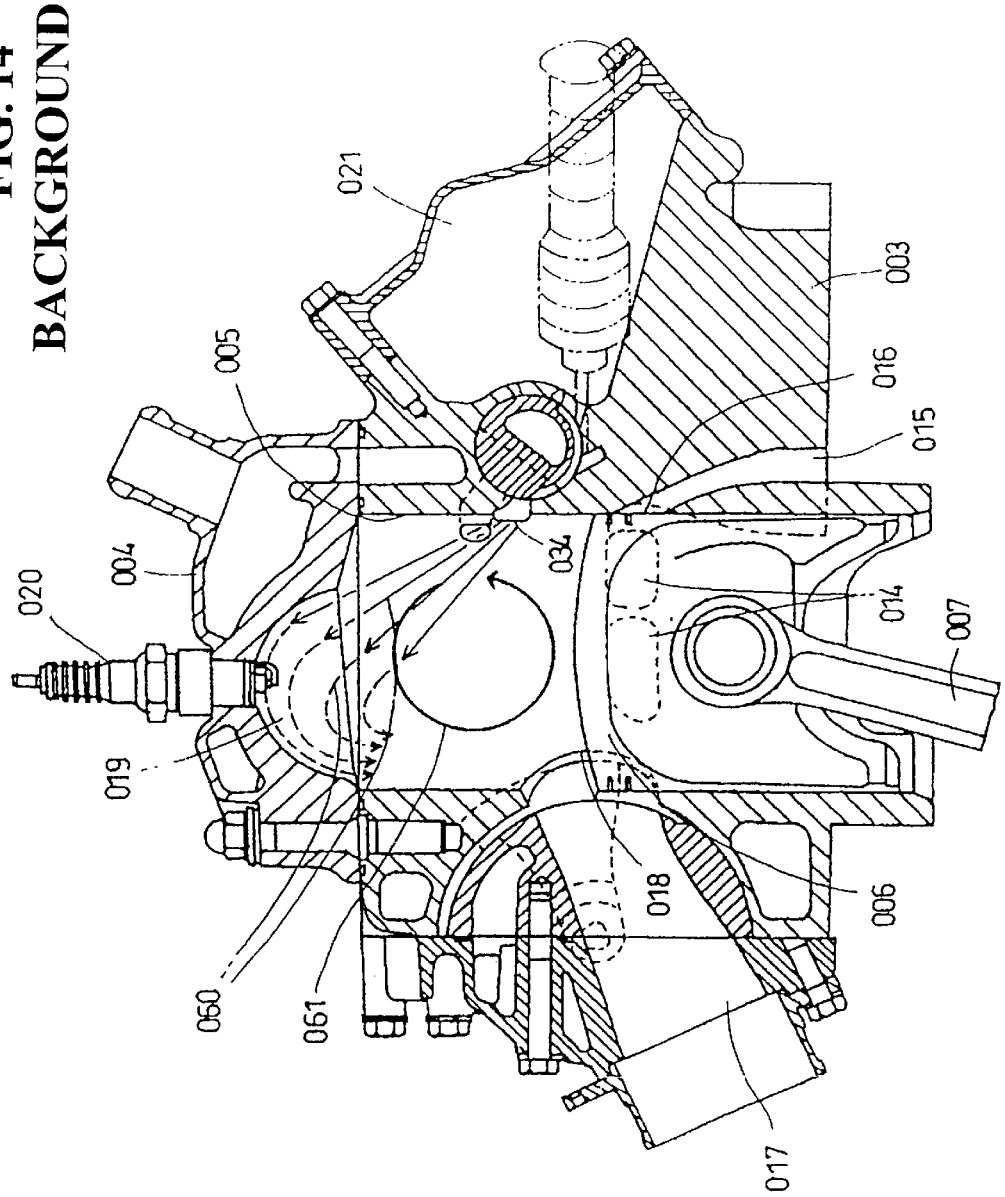
FIG. 14 is an enlarged longitudinal sectional view of an essential portion of a background art two-cycle internal combustion engine.
Figure 15:
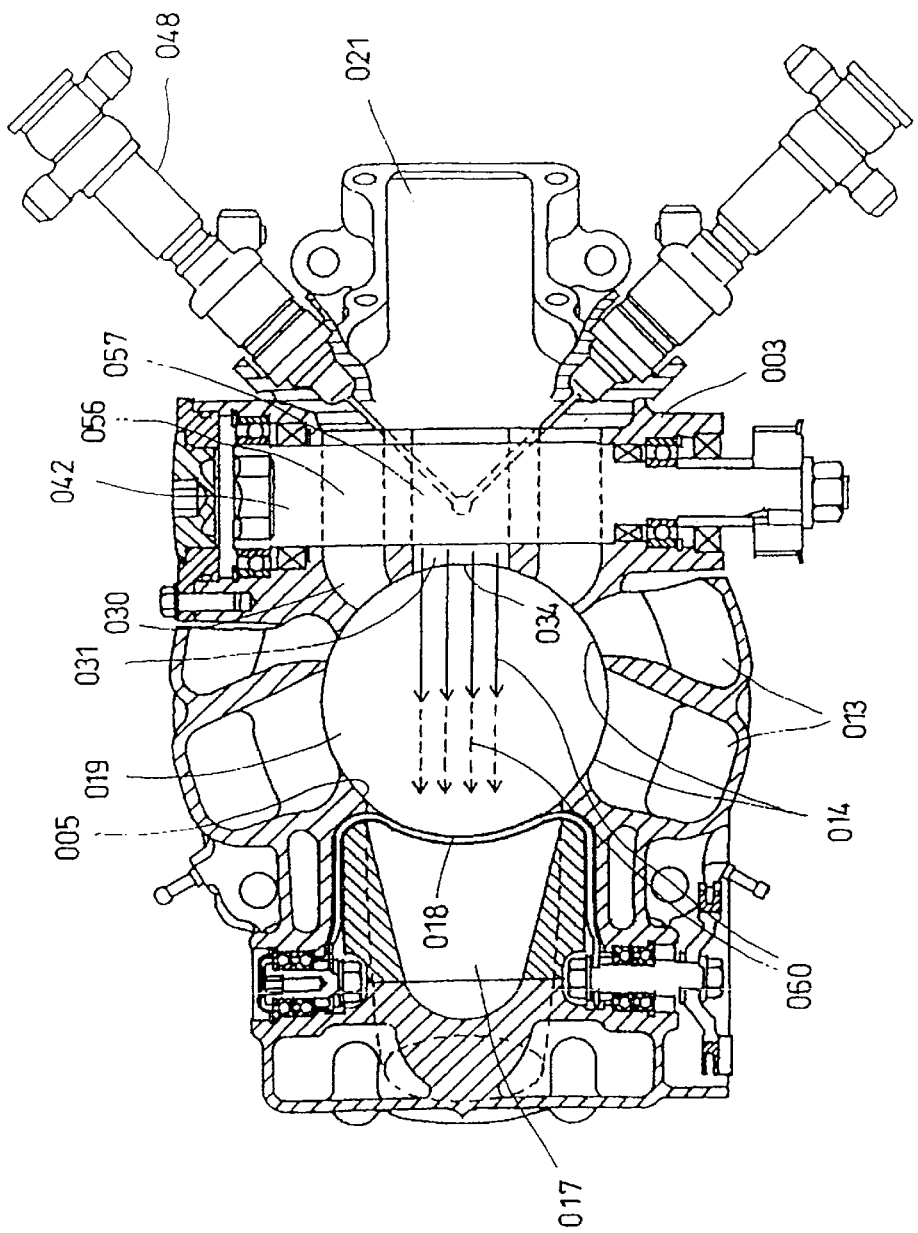
FIG. 15 is an enlarged horizontal sectional view of an essential portion of the background art internal combustion engine.

FIG. 13 is a diagram illustrating an operational cycle of this embodiment. The operational cycle of this embodiment is different from the operational cycle of each of the first to fifth embodiments in that a high compression gas is charged in the chamber portion not from the combustion chamber, but from another gas source by means of a pump (not shown). Accordingly, in this embodiment, the process "Charging of High Compression Gas in Chamber Portion Via First Communication Passage" shown by the arrow in FIG. 5 is omitted. The control valve 57a opens the communication passage 40 nearly at a point of time when the scavenging opening is closed, and closes the communication passage 40 when the compression stroke begins. The other processes are carried out in the same manner as those described in the first embodiment. In the internal combustion engine of this embodiment, since a high compression gas is charged from another gas source, it is possible to suitably adjust the air-fuel mixture blowing pressure.

According to this embodiment, as shown in FIG. 11, in order to deflect the injecting direction of a rich air-fuel mixture 60 to either the rightward direction or the leftward direction, side walls of a cylinder side passage portion 45 of the communication passage 40 are tilted with respect to the cylinder symmetric plane (containing the exhaust opening and the center line of the cylinder). FIG. 11 shows a state in which the side walls 70 of the cylinder side passage portion 45 of the communication passage are leftwardly tilted with respect to the cylinder symmetric plane in order to deflect the injecting direction of the rich air-fuel mixture to the leftward direction. The injecting direction of the rich air-fuel mixture may be deflected to the rightward direction. The height of the injecting direction of the rich air-fuel mixture may be set such that the injected rich air-fuel mixture is directed, as shown in FIG. 10, to a connecting portion between the cylinder block 3 and a cylinder head 4. As described in the first embodiment with reference to FIG. 4, such injection of the rich air-fuel mixture is advantageous in that the scavenging eddies 61 are destroyed by the flow of the rich air-fuel mixture 60, to accelerate the uniform mixture of the rich air-fuel mixture with air and prevent the fogging of the ignition plug with the rich air-fuel mixture.

According to the sixth embodiment, the tilt injection of an air-fuel mixture described in the first embodiment becomes effective for an internal combustion engine which is different from that described in the first embodiment in terms of the type of charging of a high compression gas into a chamber portion, the shape of the control valve, and the operational cycle. The configurations and functions of parts other than those described above are the same as those of the corresponding parts in the first embodiment, and therefore, the parts other than those described above are designated in the figures by the same reference numerals as the corresponding parts in the first embodiment and the overlapped description thereof is omitted.

The shape of the rich air-fuel mixture blowing port described in each of the second to fifth embodiments can be applied to an internal combustion engine which is identical to that described in the sixth embodiment in terms of the type of charging of a high compression gas into a chamber portion, the shape of the control valve, and the operational cycle. That is to say, as in the second embodiment (see FIG. 6), the side walls 70 of the cylinder side passage portion 45 of the communication passage may be tilted rightwardly or leftwardly with respect to the cylinder symmetric plane in order to deflect mist of a rich air-fuel mixture on either the right side or the left side. Furthermore, one or a plurality of the guide vanes 71 as baffle walls for deflecting the flow of the rich air-fuel mixture may be provided in the cylinder side passage portion 45 of the communication passage. With this configuration, it is possible to positively deflect the flow 60 of the rich air-fuel mixture, and hence to accelerate the mixture of the rich air-fuel mixture with air and prevent the fogging of the ignition plug with the rich air-fuel mixture.

As in the third embodiment (see FIG. 7), in order to deflect mist of the rich air-fuel mixture in the cylinder, with the flow qualities of the deflected parts on the right and left sides being made nearly equal to each other, the wedge-shaped partitioning member 72 for branching the flow of the rich air-fuel mixture may be provided in a central portion of the cylinder side passage portion of the communication passage. With this configuration, since the injected flow 60 of the rich air-fuel mixture is not directly impinged on the ignition plug, and the injected flow of the rich air-fuel mixture exerts, from the right and left sides, an effect on the scavenging eddies, it is possible to accelerate the mixture of the rich air-fuel mixture with air.

As in the fourth embodiment (see FIG. 8), in order to deflect mist of the rich air-fuel mixture in the cylinder, with the flow quantity of the deflected part on one of the right and left sides being made larger than that of the deflected part on the other side, the wedge-shaped partitioning member 72 for branching the flow of the rich air-fuel mixture into two parts may be provided in the cylinder side passage portion 45 of the communication passage in such a manner as to be offset to one of the right and left sides. Furthermore, the side walls 70a and 70b of the left and right passages of the cylinder side passage portion 45 of a communication passage may be tilted leftwardly and rightwardly with respect to the cylinder symmetric plane. With this configuration, it is possible to accelerate the mixture of the rich air-fuel mixture with air.

As in the fifth embodiment (see FIG. 9), in order to deflect mist of the rich air-fuel mixture on either the right side or the left side in the cylinder, the side walls 70 of the cylinder side passage portion 45 of the communication passage may be tilted with respect to the cylinder symmetric plane. Furthermore, the side walls 73 of the passage of the control valve 57a may be tilted in the same direction as the tilt direction of the side walls 70 of the cylinder side passage portion 45 of the communication passage. In this case, the control valve may be formed into a spiral shape. With this configuration, it is possible to positively deflect the flow 60 of the rich air-fuel mixture and hence to accelerate the mixture of the rich air-fuel mixture with air. This is effective for the case where the length of the cylinder side passage portion 45 of the communication passage cannot be sufficiently ensured.

According to the present invention, mist of a rich air-fuel mixture is injected into the cylinder while being deflected on either on the right side or the left side of the cylinder, being deflected on both the right and left sides of the cylinder with flow quantities of the branched flows being made equal to each other, or being deflected on both the right and left sides of the cylinder with flow quantities of the branched flows being made different from each other by tilting the side walls of the cylinder side passage portion of the communication passage, providing a wedge-shaped partitioning member, or forming a passage of the control valve into a spiral shape. Accordingly, since the injected flow 60 of the rich air-fuel mixture exerts, from both sides, an effect on the existent scavenging eddies 61, to destroy the scavenging eddies and disturb the flow of the scavenging eddies, with a result that it is possible to accelerate the mixture of the rich air-fuel mixture with air over the entire region of the inside of the combustion chamber before upward movement of the piston. With the above construction, desirable combustion is achieved, particularly, at full load operation of the vehicle.

Since the injecting direction of the rich air-fuel mixture is deflected to either the rightward direction or the leftward direction while avoiding the direction toward the ignition plug, it is possible to reduce the fogging of the ignition plug with the rich air-fuel mixture.

Since the rich air-fuel mixture is injected toward a connecting portion between the cylinder and the cylinder head, it is possible to suppress the ignition plug from being fogged with the rich air-fuel mixture as described. Furthermore, the inner wall of the cylinder is prevented from being made excessively wet with the rich air-fuel mixture, that is, gasoline, and hence desirable combustion is achieved and lubricating oil is suppressed from being carried away with the gasoline.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-cycle internal combustion engine, comprising:
a cylinder;
an exhaust opening provided on one side of said cylinder;
a plurality of scavenging openings for performing schnurle scavenging, said scavenging openings being located at positions laterally symmetric with respect to a cylinder symmetric plane containing said exhaust opening and a center line of said cylinder;
a chamber portion adjacent to said cylinder;
a communication passage for communicating said cylinder to said chamber portion, said communication passage having a cylinder side opening located opposite to said exhaust opening with respect to the center line of said cylinder said cylinder symmetric plane containing said communication passage; and
a control valve for openably/closably controlling said communication passage so as to blow a rich air-fuel mixture into a combustion chamber from said cylinder side opening of said communication passage by a high compression gas stored in said chamber portion, wherein side walls of a cylinder side passage portion of said communication passage are tilted toward a left side or a right side of said cylinder symmetric plane for deflecting a mist of the rich air-fuel mixture at least on either the right side or the left side of said cylinder symmetric plane.

2. The two-cycle internal combustion engine according to claim 1, further comprising at least one guide vane for assisting deflection of the flow of the rich air-fuel mixture, said at least one guide vane being provided in said cylinder side passage portion of said communication passage.

3. The two-cycle internal combustion engine according to claim 2, wherein said at least one guide vane is substantially parallel to said side walls of said cylinder side passage portion.

4. The two-cycle internal combustion engine according to claim 1, further comprising a wedge-shaped partitioning member for branching the flow of mist of the rich air-fuel mixture, said wedge-shaped partitioning member being located within said communication passage to form a pair of branched passages, wherein side walls of each of said pair of branched passages are tilted toward the left side or the right side of said cylinder symmetric plane to deflect the flow of mist of the rich air-fuel mixture to the left side and the right side of said cylinder symmetric plane.

5. The two-cycle internal combustion engine according to claim 4, wherein said wedge-shaped partitioning member is located at a center of said communication passage to form said pair of branched passages of the same size, wherein the flow quantity of each of said pair of branched passages is the same.

6. The two-cycle internal combustion engine according to claim 1, further comprising a wedge-shaped partitioning member for branching the flow of mist of the rich air-fuel mixture, said wedge-shaped partitioning member being located within said communication passage to form a pair of branched passages, said wedge-shaped partitioning member being provided in said cylinder side passage portion of said communication passage and offset to either the right side or the left side of the cylinder symmetric plane, wherein side walls of each of said pair of branched passages are tilted toward the left side or the right side of said cylinder symmetric plane, in order to deflect the flow of mist of the rich air-fuel mixture to the left side and the right side of said cylinder symmetric plane with flow quantities of the branched flows of the rich air-fuel mixture being made different from each other.

7. The two-cycle internal combustion engine according to claim 1, wherein side walls of a passage formed in said control valve are tilted in such a direction as to assist the deflection of the injecting direction of the rich air-fuel mixture.

8. The two-cycle internal combustion engine according to claim 1, wherein a wall of said cylinder side passage portion of said communication passage is tilted so as to ensure the height of the injecting direction of the rich air-fuel mixture allowing the injected rich air-fuel mixture to be directed to a connecting portion between said cylinder and said cylinder head.

9. A communication passage for a two-cycle internal combustion engine, the internal combustion engine including: a cylinder; an exhaust opening; a plurality of scavenging openings for performing schnurle scavenging; a chamber portion adjacent to the cylinder; the communication passage for communicating the cylinder to the chamber portion, the communication passage having a cylinder side opening located opposite to the exhaust opening with respect to a center line of the cylinder; and a control valve for openably/closably controlling the communication passage so as to blow a rich air-fuel mixture into a combustion chamber from the cylinder side opening of the communication passage by a high compression gas stored in the chamber portion, said communication passage comprising:
   side walls of a cylinder side passage portion of said communication passage are tilted toward the left side or the right side of a cylinder symmetric plane containing the exhaust opening, a center line of the cylinder and said communication passage for deflecting a mist of the rich air-fuel mixture at least on either the right side or the left side of said cylinder symmetric plane.

10. The communication passage for a two-cycle internal combustion engine according to claim 9, further comprising at least one guide vane for assisting deflection of the flow of the rich air-fuel mixture, said at least one guide vane being provided in said cylinder side passage portion of said communication passage.

11. The communication passage for a two-cycle internal combustion engine according to claim 10, wherein said at least one guide vane is substantially parallel to said side walls of said cylinder side passage portion.

12. The communication passage for a two-cycle internal combustion engine according to claim 9, further comprising a wedge-shaped partitioning member for branching the flow of mist of the rich air-fuel mixture, said wedge-shaped partitioning member being located within said communication passage to form a pair of branched passages, wherein side walls of each of said pair of branched passages are tilted toward the left side or the right side of said cylinder symmetric plane to deflect the flow of mist of the rich air-fuel mixture to the left side and the right side of said cylinder symmetric plane.

13. The communication passage for a two-cycle internal combustion engine according to claim 12, wherein said wedge-shaped partitioning member is located at a center of said communication passage to form said pair of branched passages of the same size, wherein the flow quantity of each of said pair of branched passages is the same.

14. The communication passage for a two-cycle internal combustion engine according to claim 9, further comprising a wedge-shaped partitioning member for branching the flow of mist of the rich air-fuel mixture, said wedge-shaped partitioning member being located within said communication passage to form a pair of branched passages, said wedge-shaped partitioning member being provided in said cylinder side passage portion of said communication passage and offset to either the right side or the left side of the cylinder symmetric plane, wherein side walls of each of said pair of branched passages are tilted toward the left side or the right side of said cylinder symmetric plane, in order to deflect the flow of mist of the rich air-fuel mixture to the left side and the right side of said cylinder symmetric plane with flow quantities of the branched flows of the rich air-fuel mixture being made different from each other.

15. The communication passage for a two-cycle internal combustion engine according to claim 9, wherein a wall of said cylinder side passage portion of said communication passage is tilted so as to ensure the height of the injecting direction of the rich air-fuel mixture allowing the injected rich air-fuel mixture to be directed to a connecting portion between said cylinder and said cylinder head.

16. A two-cycle internal combustion engine, comprising:
   a cylinder;
   a chamber portion adjacent to said cylinder;
   a communication passage for communicating said cylinder to said chamber portion, said communication passage having a cylinder side opening located opposite to an exhaust opening in said cylinder with respect to a center line of said cylinder; and
   side walls of a cylinder side passage portion of said communication passage are tilted toward a left side or a right side of a cylinder symmetric plane containing the exhaust opening, the center line of said cylinder and said communication passage for deflecting a mist of the rich air-fuel mixture at least on either the right side or the left side of said cylinder symmetric plane.

17. The two-cycle internal combustion engine according to claim 16, further comprising at least one guide vane for assisting deflection of the flow of the rich air-fuel mixture, said at least one guide vane being provided in said cylinder side passage portion of said communication passage.

18. The two-cycle internal combustion engine according to claim 16, wherein said at least one guide vane is substantially parallel to said side walls of said cylinder side passage portion.

19. The two-cycle internal combustion engine according to claim 16, further comprising a wedge-shaped partitioning member for branching the flow of mist of the rich air-fuel mixture, said wedge-shaped partitioning member being located within said communication passage to form a pair of branched passages, wherein side walls of each of said pair of branched passages are tilted toward the left side or the right side of said cylinder symmetric plane to deflect the flow of mist of the rich air-fuel mixture to the left side and the right side of said cylinder symmetric plane.

20. The two-cycle internal combustion engine according to claim 19, wherein said wedge-shaped partitioning member is located at a center of said communication passage to form said pair of branched passages of the same size, wherein the flow quantity of each of said pair of branched passages is the same.

21. The two-cycle internal combustion engine according to claim 16, further comprising a wedge-shaped partitioning member for branching the flow of mist of the rich air-fuel mixture, said wedge-shaped partitioning member being located within said communication passage to form a pair of branched passages, said wedge-shaped partitioning member being provided in said cylinder side passage portion of said communication passage and offset to either the right side or the left side of the cylinder symmetric plane, wherein side walls of each of said pair of branched passages are tilted toward the left side or the right side of said cylinder symmetric plane, in order to deflect the flow of mist of the rich air-fuel mixture to the left side and the right side of said cylinder symmetric plane with flow quantities of the branched flows of the rich air-fuel mixture being made different from each other.

22. The two-cycle internal combustion engine according to claim 16, wherein a wall of said cylinder side passage portion of said communication passage is tilted so as to ensure the height of the injecting direction of the rich air-fuel mixture allowing the injected rich air-fuel mixture to be directed to a connecting portion between said cylinder and a cylinder head of said internal combustion engine.

* * * * *